United States Patent

[11] 3,556,443

| [72] | Inventor | Robert P. Kidwell |
| | | Box 4433, El Paso, Tex. 79914 |
| [21] | Appl. No. | 746,870 |
| [22] | Filed | July 23, 1968 |
| [45] | Patented | Jan. 19, 1971 |

[54] BOUNDARY LAYER CONTROL OF AIRBORNE VEHICLES
10 Claims, 7 Drawing Figs.

[52] U.S. Cl.................................................... 244/130,
244/42, 60/243, 60/270, 137/15.2
[51] Int. Cl..................................................... B64c 21/04
[50] Field of Search........................................... 244/130;
114/67

[56] References Cited
UNITED STATES PATENTS

| 3,093,350 | 6/1963 | Wilkins | 244/42 |
| 3,261,576 | 7/1966 | Valyi | 244/130 |
| 3,262,658 | 7/1966 | Reilly | 244/42 |
| 3,276,727 | 10/1966 | Clark | 244/42 |
| 2,624,281 | 1/1953 | McNally | 244/130 |

FOREIGN PATENTS

| 821,935 | 11/1959 | Great Britain | 244/130 |
| 884,303 | 12/1961 | Great Britain | 244/130 |

Primary Examiner—Milton Buchler
Assistant Examiner—James E. Pittenger
Attorney—Wallenstein, Spangenberg, Hattis and Strampel ABSTRACT: A gaseous material, such as air, which has a characteristic, such as temperature, which is different from that of the boundary layer air flowing along the surface of the airborne vehicle involved, is directed from within the vehicle along the surfaces of the vehicle under the control of an air speed or Mach number meter so as to maintain a given Mach number independent of air speed, or under the control of an accelerometer to maintain a given direction or flight elevation. The invention may also be applied to stabilize the Mach number of a ramjet engine by stabilizing the temperature of the air which enters the combustion chamber by means which diverts part of the fuel normally fed to the combustion chamber to the inlet chamber of the ramjet engine where the fuel is injected into the incoming air without combustion to cool the same or is ignited to heat the incoming air in accordance with the measured temperature conditions of the incoming air.

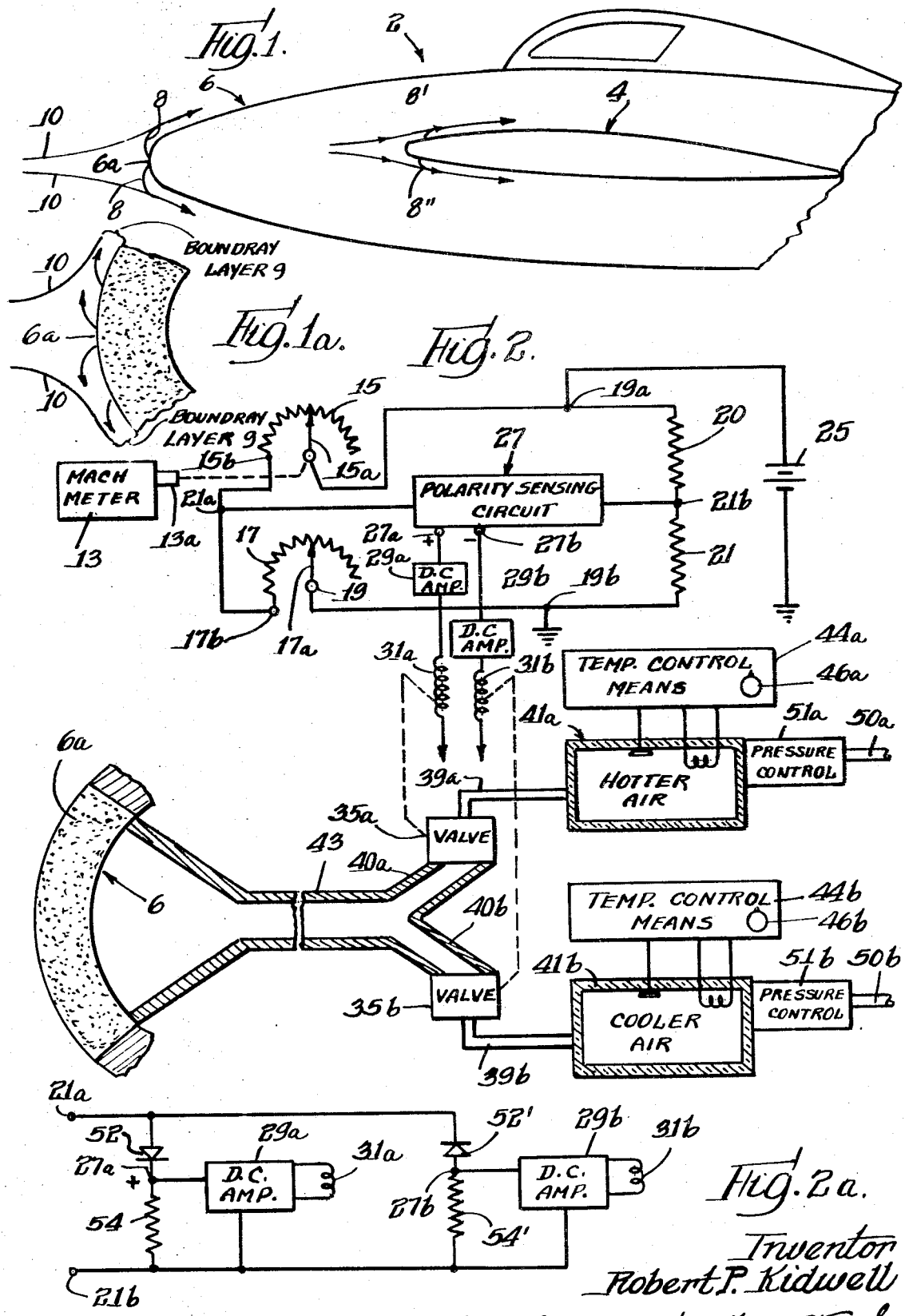

Inventor
Robert P. Kidwell

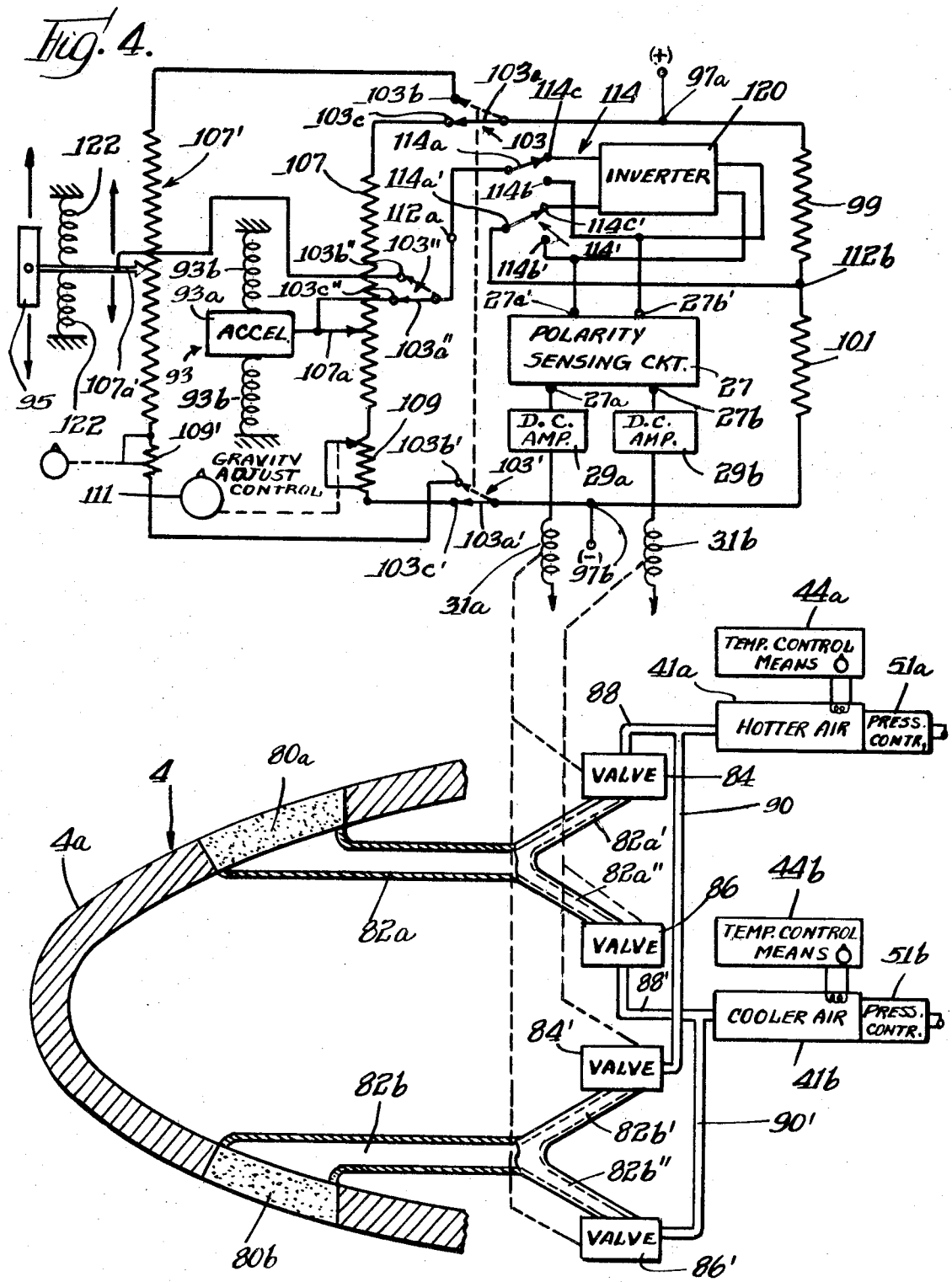

BOUNDARY LAYER CONTROL OF AIRBORNE VEHICLES

This invention relates to boundary control of aircraft and other airborne vehicles. More particularly, the present invention relates to a unique boundary layer or air control system for maintaining a fixed apparent Mach number with variation in ground speeds and conditions of the surrounding air, and for controlling elevation or direction of flight of the aircraft.

The aerodynamic forces produced on the surfaces of an aircraft depend upon the overall external differential in pressure applied to various parts of the aircraft and on the drag or frictional forces. The former is dependent primarily upon the nature of the entire surrounding atmosphere and the shapes of the parts of the aircraft, and the latter is dependent primarily on the speed of the aircraft and the characteristics of the boundary layer, which is the thin layer of air which joins the surfaces of the airborne vehicle to the surrounding undisturbed air. The thickness of the boundary layer is commonly a few thousandths of an inch. The speed of the vehicle and the nature of the boundary layer determine the drag on the aircraft.

Many aircraft vehicles are designed for optimum performance at a given Mach number. The Mach number is technically defined as the ratio of the air speed of the aircraft and the speed of sound in the surrounding undisturbed air. However, the present invention is based on the theory that, from the viewpoint of the aircraft's performance, the effective Mach number is determined by the ratio of the air speed and the speed of sound in a theoretical air mass which creates the actual boundary layer conditions of the aircraft, because the only contact of the aircraft with the surrounding atmosphere is through the boundary layer. Thus, in accordance with one aspect of the present invention, the flying conditions of an aircraft designed to operate most efficiently and effectively at a given Mach number is optimized by controlling artificially the boundary layer in response to changes in air speed or Mach number by feeding air or other gases within the aircraft which modify the boundary layer air to a degree which stabilizes the Mach number of the aircraft. In accordance with this aspect of the invention, there is provided within the aircraft one or more sources of gas which, when ejected from the aircraft at a forward portion thereof, is carried rearwardly along the outer surfaces of the aircraft to provide a boundary layer formed by a gas in which the velocity of sound is comparable to that of a boundary layer formed by the surrounding air when the aircraft is flying at the desired Mach number. The temperature of the boundary layer formed by the air surrounding a moving aircraft will always be greater than the temperature of the surrounding air because of the transfer of energy thereto when the aircraft collides with the air. For a given temperature of the surrounding air, it should be apparent that the mean or average temperature of the boundary layer formed by the air will increase with the air speed of the aircraft involved. Also, for a given air speed, the average temperature for the boundary layer formed by the surrounding air and the effective Mach number of the aircraft will increase with the temperature of the surrounding air. The effective Mach number of an aircraft going at a given air speed can be artificially increased by ejecting air or other gas from the aircraft so it forms a hotter boundary layer than that formed from the surrounding air. Conversely, the effective Mach number of aircraft can be artificially decreased by ejecting air or other gas from the aircraft so it forms a cooler boundary layer than that formed from the surrounding air.

In accordance with one form of the invention, a source of gas is provided within the aircraft whose temperature is controlled in accordance with the air speed of the aircraft. If the aircraft is designed to operate at maximum efficiency at a given Mach number, for a given air speed the desired Mach number fixes the desired temperature of the boundary layer. Thus, air or other gas is ejected from the aircraft at a temperature which will provide a boundary layer that is the same or similar to that formed by the surrounding air at the desired Mach number involved. Thus, if the gas selected is air drawn into the airplane from the surrounding air, the average or mean temperature of the boundary layer air artificially produced by the air ejected from within the aircraft will be made approximately the same as the boundary layer air formed by the surrounding air at the desired Mach number in the absence of the present invention. Other gases may be utilized which are different from that of the surrounding air.

In accordance with another form of the present invention a first source of gas is provided within the aircraft which when ejected from the forward portion of the aircraft at a given rate will increase the temperature of any boundary layer expected at various speeds of the aircraft. There is further provided a second source of gas which when ejected from the forward portion of the aircraft at a given rate will decrease the temperature of the boundary layer expected at various speeds of the aircraft. A control circuit is provided which compares the Mach number of the aircraft as determined by a conventional Mach meter with the desired Mach number and, if the aircraft is flying at a speed below the desired Mach number, the first source of gas is fed from the forward portion of the aircraft at a rate which is directly related to the difference between the actual and measured Mach numbers. Conversely, if the aircraft is flying at a speed above the desired Mach number, the second source of gas is fed from the forward portion of the aircraft at a rate which is directly related to the difference between the actual and measured Mach numbers.

In accordance with another aspect of the invention, the Mach number of a ramjet engine, which unlike most other power sources, is operable over only a very narrow range of speeds, is stabilized preferably by stabilizing the temperature of the air entering the combustion chamber of the ramjet engine by ejecting fuel into the incoming air to cool the incoming air if the temperature thereof is above the desired value and by ejecting and igniting the fuel as it is passed into the incoming air if the temperature thereof is below the desired value.

In accordance with still another aspect of the invention, the elevation or direction of flight of an aircraft is controlled or stabilized by feeding relatively hot and cold gases over the opposite surfaces of the airfoils of an aircraft to provide the desired unbalance of forces on the aircraft for lift or directional control. Lift is a factor both of the configuration of the wings, which affects the relative speed of the air streams moving above and below the wings, and the characteristics of the boundary layer passing above and below the wings. In one form of the invention, the boundary layer air above and below the wings is modified and controlled in accordance with the output of an accelerometer so the gases fed over the wing surfaces oppose a change in the elevation of the aircraft. In a similar way, the elevation of the aircraft can be very quickly and efficiently controlled without varying the angle of attack thereof by a manual control operated by the pilot which feeds gases above and below the wing surfaces to effect a positive or negative lift on the aircraft.

The above and other features and advantages of the above invention will become apparent upon making reference to the specification to follow, the claims and the drawings wherein:

FIG. 1 is a view of an aircraft to which the present invention is applied at the nose and wings thereof;

FIG. 1a is a greatly enlarged fragmentary view of the nose portion of the aircraft of FIG. 1;

FIG. 2 is a block diagram of the preferred system which controls the feeding of gases to the nose of the aircraft shown in FIG. 1;

FIG. 2a is a circuit diagram of the polarity sensing circuit shown in block form in FIG. 2;

FIG. 4 shows the manner in which gases are directed to the top and bottom surfaces of the wing of the aircraft shown in FIG. 1.

Figure 5:
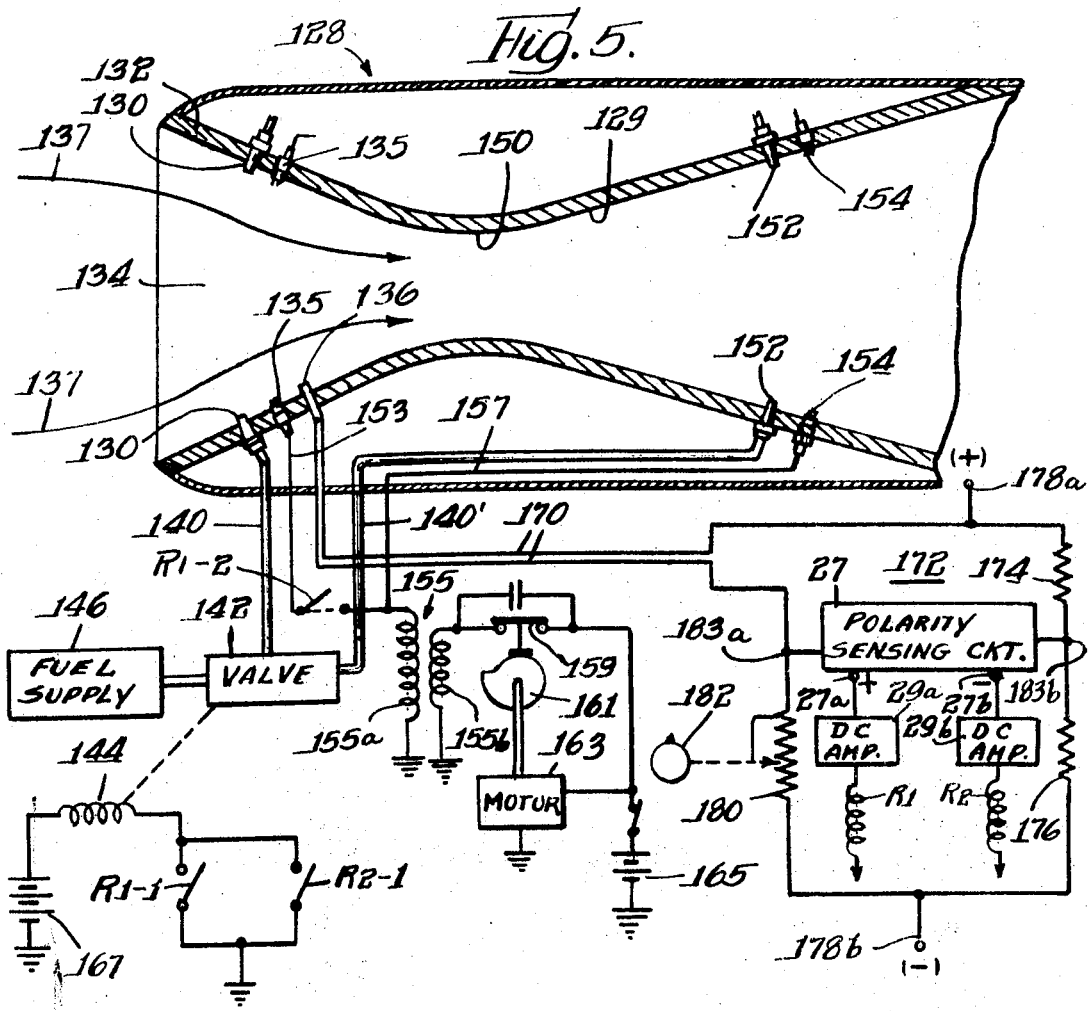
FIG. 5 is a diagram illustrating the application of the present invention in the control of the Mach number of a ramjet engine.

Refer more particularly to FIG. 1 which shows the forward portion of an aircraft 2 having wings 4 and a fuselage 6 The boundary layer control system of the invention artificially controls the boundary layer of either or both the fuselage 6 and the wings 4 in a unique manner. Thus, as previously indicated, in accordance with one of the aspects of the invention, a gas 8 stored within the aircraft 2 is fed from or in the vicinity of the nose 6a of the aircraft 2 so that the gas flows rearwardly over the surfaces of the fuselage 6 to create an artificial boundary layer 9 (FIG. 1a) about the fuselage. The temperature and/or the rate of flow of the gas 8 may be under control of a conventional air speed or Mach number meter, so that the Mach number can be stabilized to a desired level where the aircraft has its optimum performance. Two exemplary gas control systems for controlling the feeding of the gas 8 from the nose of the aircraft will be described later on in the specification.

The surrounding air 10 forms a streamlined airflow around the aircraft 2 and, depending upon the rate at which the gas 8 flows from the nose 6a of the aircraft, mixes in various degrees with the gas 8. In the absence of the gas 8, as above indicated, the collision of the nose 6a of the aircraft with the surrounding air 10 transfers energy to the air to heat the same up substantially. The greater the air speed of the aircraft, the greater will be the transfer of energy and the heating of the air 10. In the absence of the gas 8, the temperature of the boundary layer air formed by the surrounding air 10 will be at a maximum at the nose 6a of the aircraft. The temperature of the air at this point is referred to as the stagnation temperature. The boundary layer air temperature will decrease from this point along the surfaces of this aircraft. For any given Mach number and air speed, stagnation temperature and boundary layer conditions for air are roughly fixed. In one form of the invention, the gas 8 is air drawn into the aircraft from the surrounding air and heated so that when it is ejected from the aircraft it forms a boundary layer having the same average temperature as the boundary layer which would be present at the desired Mach number in the absence of the ejected air.

The ejection of the air from the nose 6a of the aircraft is facilitated by forming a portion of the nose out of a suitable porous ceramic material as shown, which allows air or other gases readily to pass to the outside of the fuselage. The porous nose portion 6a extends in all directions so that air will flow along the fuselage on all sides thereof.

In accordance with another form of the present invention, the lift characteristics of the wings 4 of the aircraft can be controlled or varied by expelling gases 8'—8" fed from within the wings 4 at the front thereof, to create artificial boundary layers or streams of air above and/or below the wings 4. The lift of aircraft wings depends on the differential pressures on opposite sides of the wings. These pressures are dependent, in part, upon the conditions of the boundary layer of the wing surface. Although various boundary layer control systems for aircraft wings have been proposed in the past, none has been controlled or used in the manner of the present invention. For example, in accordance with one aspect of the invention, the lift characteristics of the wings 4 are stabilized to provide level flight by controlling the flow of the gases 8'—8" in accordance with the output of an accelerometer. If an instability in the elevation of the aircraft develops which causes vertically movable accelerometer sensing elements to move in one direction or the other, the accelerometer produces a signal which controls the temperature or other characteristic of the gases 8' and 8" above and/or below the wing surfaces to stabilize the elevation of the aircraft. In a similar fashion, a change in elevation of the aircraft without a change in the angle of attack thereof can be readily obtained by a manual control which controls the temperature of the gases 8' and 8" above and below the wings 4. Exemplary systems for controlling the flow of the gases 8' and 8" for lift control will be described later on in the specification.

Referring now more particularly to FIG. 2, the gas control system thereshown includes a Mach meter 13 which has an output shaft 13a whose angular position is a measure of the Mach number of the aircraft. The Mach meter is arranged so it responds to the boundary layer temperature rather than the temperature of the surrounding air, and is calibrated accordingly. This shaft is coupled to the shaft of a wiper 15a of a variable resistor 15. The variable resistor 15 is connected into a Wheatstone bridge circuit including another variable resistor 17 having a wiper 17a attached to an adjusting knob 19. The variable resistors 15 and 17 form two of the arms of the bridge circuit. At bridge balance, these resistors could be of equal or different values depending on the resistance values of the other arms of the bridge circuit. If all the bridge arms are to be of equal value at bridge balance, the adjusting knob 19 is positioned so that the resistance between one end 17b of the resistor 17 and the wiper 17a is equal to the resistance between the end 15b of the resistor 15 and the wiper 15a when the Mach meter 13 measures a desired Mach number at which the associated aircraft operates at maximum effectiveness. The Wheatstone bridge circuit includes series connected resistors 20 and 21 constituting the other two arms of the bridge circuit. Accordingly, the resistors 15 and 17 are connected in series between bridge input terminals and 19a and 19b, and resistors 20 and 21 are connected in series between the bridge input terminals 19a and 19b. The output terminals of the bridge circuit identified by reference numerals 21a and 21b are respectively connected between the points of juncture of the variable resistors 15—17 and the other resistors 20—21. A source of energizing voltage 25, which is preferably a source of DC voltage, is connected between the bridge input terminals 19a and 19b and a polarity sensing circuit 27 is connected between the bridge output terminals 21a and 21b. When the output of the bridge circuit is such that terminal 21a is positive with respect to terminal 21b, the polarity sensing circuit 27 provides a central voltage at an output terminal 27a which is fed to a DC amplifier 29a which, in turn, controls the energization of a valve operating solenoid 31a. The polarity sensing circuit also has an output 27b at which a control voltage appears when the terminal 21a is negative with respect to the terminal 21b. This voltage is fed to a DC amplifier 29b whose output controls the energization of a valve operating solenoid 31b. The solenoids 31a and 31b, respectively, control the degree to which valves 35a and 35b are opened. When the solenoid 31a is energized, the valve 35a is closed and when the solenoid 31a is energized, the valve 35a then opens to a degree, depending upon the amount of current flowing through the solenoid 31a. The solenoid 31b controls the valve 35b in the same manner as the solenoid 31a controls the valve 35a.

The valve 35a has an inlet conduit 39a extending from an air chamber 41a which contains a supply of heated air at a controlled temperature. An output conduit 40a extends from the output side of the valve 31a to a conduit 43 which leads to the nose 6a of the fuselage 6.

Similarly, the valve 35b has an inlet conduit 39b extending from an air chamber 41b which contains heated air at a temperature much lower than the air in the air chamber 41a. An outlet conduit 40b extends from the valve 35b to the conduit 43 leading to the nose 6a of the fuselage 6. A temperature control means 44a is provided having a manually adjustable control knob 46a for setting the temperature at which the air in the chamber 41a is to be maintained. The temperature for this air is selected so that, when it is ejected from the nose 6a at an intermediate rate (which is obviously at a velocity insignificant relative to the speed of the aircraft), it will be hotter than the stagnation temperature of the surrounding air would be in the absence of the invention over a range of speeds for which the present invention is to be effective. The boundary layer will be made progressively warmer as the valve 35a opens wider to let a greater quantity of air flow to the nose 6a of the fuselage 6. A similar temperature control means 44b is provided which controls the temperature of the air in the air chamber 41b. A control knob 46b is provided for setting the temperature of the air therein. This temperature is selected so that when the air in the chamber 41b is ejected from the nose 6a of the fuselage 6 at an intermediate rate, it will be at a temperature lower than the stagnation temperature of the surrounding air in the absence of the present invention over the range of speeds of the aircraft over which the invention is to be effective.

The source of air in the chambers 41a and 41b may be air drawn from the surrounding atmosphere into inlet conduits 50a and 50b, respectively, leading to pressure control means 51a and 51b which respectively maintain the air within the chambers 41a and 41a at a desired pressure. The temperature control means 41a and 41b and pressure control means 51a and 51b are well known apparatus and need not be described in detail.

It can thus be seen that when the Mach number meter 13 indicates that the speed of the aircraft is below the desired Mach number as set upon the control knob 19 of resistor 17, air will be fed from the hotter air chamber 41a to the valve 35a where it then passes through conduit 43 leading to the nose 6a of the fuselage at a rate proportionate to the differences between the measured and desired Mach numbers. Conversely, when the Mach number meter indicates that the Mach number of the aircraft is above the desired Mach number, air will be fed from the cooler air in the chamber 41b to the valve 35b where it then passes through conduit 43 to the nose 6a at a rate proportionate to the difference between the measured and desired Mach numbers.

An exemplary application of the invention is as follows: An aircraft designed for optimal performance, for example, at Mach 1.8 is flying at a speed of Mach 2.0 at which the stagnation temperature is 227° C. For a speed of Mach 1.8, the stagnation temperature will be instead 220° C. In accordance with the invention, gas is released from inside of the aircraft at a pressure of 20 atmospheres and a temperature of 375° C. so that upon expansion of the gas it will provide an artificially reduced stagnation temperature of 220° C., thereby simulating the optimal speed of Mach 1.8 instead of its actual speed of Mach 2.0 in the unmodified air.

FIG. 2a illustrates an exemplary circuit for the polarity sensing circuit 27 which controls the energization of the solenoids 31a and 31b. Thus, as shown in FIG. 2a, the circuit 27 includes a rectifier 52 and a resistor 54 connected in series between the bridge output terminals 21a and 21b, so that a voltage will appear at the output terminal 27a at the juncture between the rectifier 52 and resistor 54 only if bridge output terminal 21a is positive with respective to the bridge output terminal 21b. Similarly, a rectifier 52' is connected in series with a resistor 54' across the bridge output terminals 21a and 21b so that a voltage will appear at the output terminal 27b only if the bridge output terminal 21a is negative with respect to the bridge output terminal 21b. The DC amplifier 29a is connected to sense the voltage across the resistor 54 and the DC amplifier 29b is connected to sense the voltage across resistor 54'.

Figure 3:
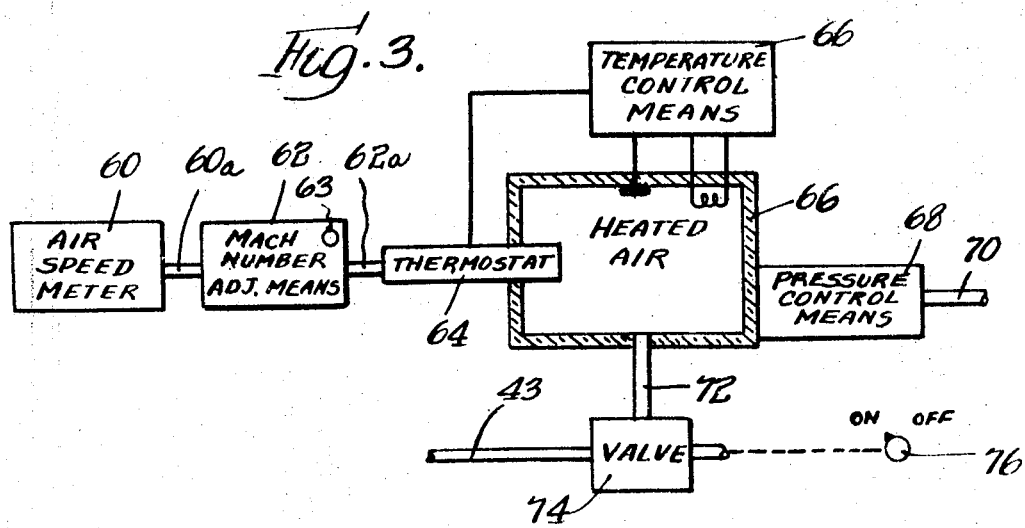
FIG. 3 is a block diagram of another system for controlling the feeding of gases to the nose of the aircraft of FIG. 1.

Refer now more particularly to FIG. 3 which shows another system of the invention for controlling the flow of gas 8 from the nose 6a of the fuselage 6. In this gas control system, the rate of gas flow is controlled in accordance with the airspeed of the aircraft 2. Accordingly, an airspeed meter 60 is provided having an output shaft 60a whose angular position is a measure of the airspeed of the aircraft 2. The shaft 60a extends to a Mach number adjusting means 62 which has an output shaft 62a. The Mach number adjusting means 62 has an adjusting knob 63 whose angular position adjusts the relative angular position between the shafts 60a and 62a for reasons to be explained. The output shaft 62a extends to a suitable temperature control means, such as a thermostat 64. The thermostat 64, in conjunction with a temperature control means 66, controls the temperature of the air in a chamber 66. The pressure of the air within the chamber 66 is maintained at a given level by a suitable pressure control means 68 which controls the feeding of air from an inlet conduit 70 to the chamber 66. The inlet conduit 70 extends to a point outside of the aircraft where air is drawn from the surrounding atmosphere.

As previously indicated, for any given airspeed, the apparent Mach number of the aircraft is determined by the temperature of the boundary layer air. Moreover, as the Mach number of the aircraft is to be increased for a given airspeed, the temperature of the boundary layer air should be increased. Accordingly, the desired position of the output shaft 62a for a given air speed is determined by the desired Mach number and so the Mach number adjusting means 62 provides a means for setting the adjustment of the thermostat 64 for a given airspeed.

An outlet conduit 72 extends from the chamber 66 to an on-off valve 74 which may be opened or closed by a suitable manual control 76. The outlet of the valve 74 is connected to the aforementioned conduit 43 leading to the nose 6a of the aircraft 6. As is apparent from the explanation of the invention previously given, the temperature of the air within the chamber 66 is so that, when it is ejected from the nose 6a of the fuselage 6, the boundary layer conditions will be such as to provide a Mach number approximating that of the desired Mach number of the aircraft involved.

Refer now more particularly to FIG. 4 which illustrates a system for selectively automatically or manually controlling the lift on the wings 4 of the aircraft 2 by controlling the gases 8' and 8" flowing from the upper and lower portions of the wings 4 shown in FIG. 1. Accordingly, near the leading edge 4a of each wing 4 there are provided air discharge sections 80a and 80b along substantially the full lengths of the wings. These sections preferably comprise porous ceramic sections which permit air or other gas to flow readily therethrough.

Conduits 82a extend from the upper porous section 80a and branch into conduit branches 82a' and 82a" respectively, extending to control valves 84 and 86. Similarly, conduits 82b extend from the lower porous section 82b and branch into conduit branches 82b' and 82b" respectively, extending to control valves 84' and 86'. The valves 84 and 84' respectively control the flow of air from air chambers 41a and 41b which are connected to the inlets of the valves 84 and 86 by conduits 88 and 88'. Another set of valves 84' and 86' are provided to respectively control the flow of air from air chambers 41a and 41b to the conduits 82b' and 82b" leading to the discharge conduit 82b associated with the lower porous section 80b of each wing 4. Accordingly, conduits 90 and 90' respectively extend from the air chambers 41a and 41b to the inlets of valves 84' and 86'. The air chambers 41a and 41b may contain the identical relatively hotter and cooler air contained in the air chambers 41a and 41b referred to in the embodiment of the invention of FIG. 2. Also there are associated with the air chambers 41a and 41b temperature control means 44a and 44b and pressure control means 51a and 51b which perform the same functions as the similarly numbered elements in FIG. 2.

The valves 84 and 86' are controlled by a solenoid 31a in the same manner as the valve 35a in FIG. 2 is controlled by the solenoid 31a. Thus, the valves 84 and 86' are closed when the associated solenoid is deenergized and is open to a degree depending upon the degree of energization of the solenoid 31a. Similarly, the valves 86 and 84' are controlled by a solenoid 31b which effects the closure of the valves 86 and 84' when the solenoid 31b is deenergized and opens these valves to a degree depending upon the degree of energization of the solenoid 31b.

The solenoids 31a and 31b in FIG. 4 may be driven from the outputs of DC amplifiers 29a and 29b which, in turn, are energized in accordance with the signals appearing at the outputs 27a and 27b of the polarity sensing circuit 27 in the identical manner previously described in connection with the embodiment of the invention shown in FIG. 2. The output of a bridge circuit also controls the polarity sensing circuit 27, and, as illustrated, the bridge circuit is a potentiometer rather than a variable resistance bridge circuit, and the bridge circuit variable is selectively controlled by an accelerometer 93 or a manual elevation control member 95.

The input voltage to the bridge circuit as shown in FIG. 4 is supplied across input terminals 97a and 97b. The input voltage is most preferably a source of DC voltage connected so that the terminal 97a is positive with respect to the terminal 97b. A pair of fixed resistors 99 and 101 are connected in series between the input terminals 97a and 97b. The resistors 99 and 101 form two arms of the potentiometer bridge circuit. Ganged single-pole, double-throw switches 103 and 103' are respectively provided to selectively connect the outer terminals of a potentiometer 107 or 107' across the input terminals 97a and 97b. The switch 103 has a movable contact 103a connected to the input terminal 97a and a pair of stationary contacts 103b and 103c with which the movable arm 103a can make selective contact. The switch 103' has a movable contact 103a' connected to the input terminal 97b which contact can make selective contact with the stationary contacts 103b' and 103c'. One end of the potentiometer 107 is connected to the stationary contact 103c of switch 103 and the other end is connected to one end of an adjustable resistor 109 whose opposite end is connected to the stationary contact 103c' of switch 103. The value of the resistor 109 is determined by the position of an adjustable control 111 which is a gravity control adjusting means used to balance the bridge circuit at zero vertical acceleration at a given elevation. Thus, it can be seen that when the movable arms 103a and 103a' are connected to the stationary contacts 103c and 103c', the potentiometer 107 and the adjustable resistor 109 are connected across the bridge input terminals 97a and 97b.

The output terminals of the bridge circuit are identified by reference numerals 112a and 112b. 112b is connected to the juncture of resistor 99 and 101. The terminal 112a is connected to the wiper 107a of the potentiometer 107 through a switch 103'' having a movable contact 103a'' ganged for movement with the movable contacts 103a and 103a' of switches 103 and 103'. The movable contact 103a'' is selectively engageable with contact 103b'' or 103c''. The contact 103c'' is connected to the wiper 107a.

The position of the wiper 107a may be determined by the position of a vertically movable weight 93a of the accelerometer 93. As illustrated, the weight 93a is supported in a normal intermediate position by a pair of vertically oriented springs 93b–93b. The accelerometer weight is constrained to move only in the direction of the axis of the springs 93b–93b. When the aircraft starts to suddenly drop in elevation, the weight 93a will start to rise to move the wiper 97a toward the top of the potentiometer, and, when the aircraft starts suddenly to rise, the accelerometer is preferable heavily damped so that it will not oscillate very much about its center position. Thus, any tendency of the aircraft to change in elevation will result in a positive or negative voltage across the output terminals 112a and 112b, depending upon whether the direction of the change in elevation is downward or upward. As will appear, such tendency to change the elevation will be opposed by the feeding of appropriate gases to the upper and lower surfaces of the aircraft 4 to keep the airplane at a relatively stable elevation.

Since the heating of air causes a reduction in air density and the cooling of air represents an increase in air density, the movement of hotter air across the top of a wing surface and cooler air over the bottom of a wing surface will increase the lift thereof (below the speed of sound) and, conversely, the movement of cooler air over the top of a wing surface and hotter air over the bottom of a wing surface will decrease the lift thereof. This rule is inverted above the speed of sound. Accordingly, the bridge output terminals 112a and 112b are connected to the movable contacts 114a and 114a' of switches 114 and 114' which have stationary contacts 114b–114c and 114b'–14c' respectively selectively engageable by movable contacts 114a and 114a'.

When the movable contacts 114a and 114a' are connected to the stationary contacts 114b and 114b', the output terminals of the bridge circuit are connected directly to the inputs 27a' and 27b' of the polarity sensing circuit 27. When the movable contacts 114a and 114a' are connected to the stationary contacts 114c and 114c', the output terminals of the bridge circuit are connected to the inputs of an inverter circuit 120 which inverts the polarity of the voltage fed to the input terminals 27a' and 27b' of the polarity sensing circuit 27 so that the polarity sensing circuit will cause control operations exactly opposite to that which occurs when the output of the bridge circuit bypasses the inverter circuit 120.

It thus can be seen that for speeds of the aircraft below the speed of sound, the tendency of the aircraft to rise will result in the feeding of a voltage to the output terminal 27a of the polarity sensing circuit 27 and the tendency of the aircraft to drop will result in the feeding of a voltage to the output terminal 27b of the polarity sensing circuit 27, so air fed to the upper and lower surfaces of the wings to oppose a change in the elevation of the aircraft.

When the ganged switches 103, 103' and 103'' are operated so that their movable contacts engage stationary contacts 103b, 103b' and 103b'', the potentiometer 107 is disconnected from the bridge circuit and the other potentiometer 107' is connected thereto. Thus, the opposite ends of potentiometer 107' are respectively connected between stationary contact 103b of switch 103 and a gravity adjusting resistor 109', in turn connected to the stationary contact 103b' of switch 103''. The potentiometer 107' has a wiper 107a' connected to the stationary contact 103b' of switch 103''. The position of wiper 107a' is controlled by the manual control member 95 which is stabilized in a centered position by springs 122–122. Thus, when the manual control member 95 is moved upwardly, the wiper 107a' will be moved upwardly, resulting in the feeding of a voltage to the polarity sensing circuit 27 which will cause air to be ejected along the wings which will move the aircraft upwardly. Conversely, when the manual control member 95 is moved downwardly, the polarity of the voltage fed to the input of the polarity sensing circuit 27 will be in a direction to cause the flow of air along the wings of which will move the aircraft downwardly.

It should be appreciated that the means for stabilizing or controlling the elevation of an aircraft shown in FIG. 4 can also be applied to the similar control of air flow over the elevator or rudder surfaces of an aircraft, although the control of air flow over the wing surfaces of an aircraft is by far the more important of these applications.

As previously indicated, the present invention is also applicable for stabilizing the Mach number of a ramjet engine. Reference should now be made to FIG. 5 where a ramjet engine is shown, identified by reference numeral 128. As is well known, a ramjet engine is only operable over a limited range of Mach numbers and thus to maintain the Mach number of such an engine in the desired range is of exceeding importance. This stabilization can be effected by automatically stabilizing the temperature of the air entering the combustion chamber 129 of the engine. To this end, as shown in FIG. 5, a means for automatically controlling the temperature of the air entering the combustion chamber is provided. This means includes a series of fuel ejection nozzles 130 positioned at circumferentially spaced points along a tapering wall 132 defining the inlet chamber 134 of the ramjet engine 128. The tapered inlet chamber 134 terminates in a reduced neck portion 150 at which point the outwardly diverging combustion chamber 129 begins. Adjacent to each of the nozzles 130 is a sparkplug 135 or other engine ignition device. A temperature sensing means, such as temperature responsive resistor 136, is mounted near each nozzle 130 to sense the temperature of the incoming air 137. In a manner to be described, if the temperature of the incoming air is greater than a predetermined desired value, fuel is preferably ejected into the incoming air in the inlet chamber 134. The expanding fuel now in gaseous form will cool the incoming air. If the temperature of the incoming air is lower than the desired value, the spark plug 135 adjacent each gas ejecting nozzle 130 is energized to ignite the fuel ejected into the incoming air, to raise the temperature of the incoming air.

As illustrated, the various fuel ejecting nozzles 130 are connected by conduits 140 to a fuel control valve 142 controlled by a solenoid 144. The inlet side of the valve 142 is connected to the fuel supply 146. When the solenoid 144 is energized, the valve 142 is opened to direct fuel to the fuel ejective nozzles 130. The fuel from the fuel supply 146 is also directed in a conventional way to fuel ejecting nozzles 152 in the combustion chamber 129 of the ramjet engine. The fuel ejected from the fuel ejecting nozzles 152 is ignited by suitable spark plugs 154 or other ignition devices. In the case where the fuel ejected into the inlet chamber 134 is not ignited, the ejected fuel is still useful when it reaches the combustion chamber where it can be ignited along with the fuel being ejected from the fuel ejecting nozzles 152. The valve 142 can be designed so that the total fuel fed to the fuel ejecting nozzles 113 and 115 remains constant when fuel is exerted into the incoming air without ignition. Accordingly, the fuel ejecting nozzles 152 in the combustion chamber 129 are shown connected by conduits 140' to the valve 142. However, it is understood that the fuel ejecting nozzles 152 may be fed with fuel independently of the operation of the valve 142 so that the fuel ejected from the fuel ejecting nozzles 130 in the inlet chamber 134 is in addition to the fuel normally fed to the fuel ejecting nozzles 152 in the combustion chamber.

The spark plugs 135 in the inlet chamber 139 are connected by a conductor 153 to a normally-open set of contacts R1–2 of a relay R1. The contacts R1–2 are connected to the secondary winding 155a of a conventional ignition transformer 155. The spark plugs 154 in the combustion chamber are connected to a conductor 157 leading directly to the output side of the secondary winding 155a so that the spark plugs 154 will receive their ignition potential independently of the energized condition of the relay R1. The ignition transformer 155 has a primary winding or ignition coil 155b located in a more or less conventional ignition control circuit. Accordingly, the ignition coil 155b is connected in series with a set of interrupter contacts 159 which are opened and closed in a suitable way, such as by a cam 161 driven by a motor 163. A source of DC voltage 165 is connected to the motor 163 and to the interrupter contacts 159, so a periodic interruption of the circuit leading to the ignition coil 155b takes place to generate high voltage pulses in the secondary winding 155a to develop sparks across the associated spark plugs.

The solenoid 144, which controls the valve 142, may be located in an energizing circuit including a source of DC energizing voltage 167 connected to one side of the solenoid 144 and a pair of parallel connected normally-open contacts R1–1 of the aforementioned relay R1 and R2-1 of another relay R2. Thus, when either relay R1 or R2 is energized, the solenoid 144 will become energized to operate the valve 142 to permit the fuel 146 to be fed to the fuel ejection nozzles 130 in the inlet chamber 134.

The temperature responsive resistor 136 is connected by a pair of conductors 170 to a Wheatstone circuit 172. The temperature responsive resistor 136 forms one arm of the bridge circuit 172, the other arms being formed by a pair of resistors 174 and 176 connected in series between a pair of input terminals 178a and 178b of the bridge circuit. The temperature responsive resistor 136 has one end connected to the input terminal 178a and an end connected to a variable resistor 180 whose resistance depends upon the angular position of a manually operable control point 182 which sets the control temperature. The resistor 180 is, in turn, connected to the other input terminal 178b of the bridge circuit. As in the previously described bridge circuits, the input terminals 178a and 178b preferably connected to a source of DC voltage. The resistor 180 is set at a value which provides a zero bridge output when the temperature responsive resistor 136 is exposed to air at a desired control temperature for the desired Mach number involved. The output of the bridge circuit appears across terminals 183a and 183b which are respectively located at the juncture of the temperature responsive resistor 136 and the variable resistor 181, on the one hand, and the juncture of the resistors 174 and 176, on the other hand.

The input terminals 183a and 183b of the bridge circuit are connected to the input of a polarity sensing circuit 27 like that previously described. Thus, the positive signal output terminal 27a of the polarity sensing circuit 27 is connected to a DC amplifier 29a controlling the energization of the aforementioned relay R 1 and the negative output terminal 27b of the polarity sensing circuit 27 is connected to a DC amplifier 29b controlling the energization of the aforementioned relay R2.

When the temperature of the incoming air is below the control temperature, the positive signal output terminal 27a of the polarity sensing circuit 27 will be energized to energize as the relay R1. Energization of the relay R1 closes contacts R1–1, energizing the solenoid 144 to operate valve 142 to allow fuel to flow to inlet chamber nozzles 130 and closes the contacts R1-2 to connect the spark plugs 135 in the inlet chamber 134 to the secondary winding 155a of the ignition transformer 155. It is thus apparent that under these circumstances the incoming air will be heated by the ignition of fuel in the inlet chamber 134.

When the temperature responsive resistor 136 senses a temperature which is above the control temperature, the negative signal output terminal 28b of the polarity sensing circuit 27 will be energized to effect the energization of the relay R2. Then contacts R2-1 will close to energize solenoid 144 operating the valve 142 to cause fuel to flow to the fuel ejection nozzles 130 without ignition thereof. Under these circumstances, the incoming air will be cooled.

Assume that a ramjet engine, for example, is designed to operate at a speed of Mach 1.8. In such case, the ramjet will be very inefficient at, for example, a speed of Mach 1.5. If the ramjet should be flying at a speed of Mach 1.5, the optimal speed of 1.8 can be simulated by ejecting and igniting fuel into the inlet air to raise the temperature of the incoming air to that normally expected where the speed is Mach 1.8. If the ramjet is flying at a speed of Mach 2.0, the optimal speed of Mach 1.8 can be simulated by ejecting fuel into the inlet air without igniting the same. In such case, the higher temperature air caused by the higher than desired speed limit of Mach 2.0 can be reduced to a temperature which the ramjet inlet air would have when the engine is operating at a speed of Mach 1.8.

It is apparent that the various forms of the present invention provide a very unique and advantageous means for controlling various flight characteristics of an airborne vehicle.

It should be understood that numerous modifications may be made in the most preferred forms of the invention described above without deviating from the broader aspects thereof.

I claim:

1. A boundary layer control system for an airborne vehicle for controlling a variable flight characteristic of the vehicle the improvement comprising: a first source of gas of a first temperature which, when directed from the vehicle at a given point on the outside thereof where it flows rearwardly along the outer surface of the vehicle, increases the temperature of the boundary layer and a second source of a gas of a second temperature much lower than said first temperature and which, when directed from the vehicle at a given point on the outside thereof where it flows rearwardly along the outer surface of the vehicle, decreases the temperature of the boundary layer to control said variable flight characteristic; gas flow control means for selectively connecting said first or second sources of gas to said given point of the vehicle, and operating means for operating said gas flow control means to release the gas of one of said sources of gas depending on the desired value of said flight characteristic.

2. The boundary layer control system of claim 1 wherein there is provided measuring means providing a measure of the condition of said flight characteristic and said operating means being automatically responsive to the condition of said flight characteristic indicated by the measuring means for operating said gas flow control means to select the gas to be fed to said given point.

3. The boundary layer control system of claim 1 wherein the vehicle has wings and said given point of gas ejection is at the forward portion of the wings to control the lift characteristics thereof.

4. The boundary layer control system of claim 1 wherein said first gases are fed to said given point on the outside of the vehicle through a porous wall.

5. A boundary layer control system for an airborn vehicle for controlling a flight characteristic of the vehicle, the improvement comprising: a source of gas which, when ejected from the vehicle at a given point where it flows rearwardly along the surfaces of the vehicle, provides a boundary layer which is substantially different from the boundary layer which would otherwise be formed from the surrounding air at a given air speed of the vehicle; and means responsive to a flight characteristic of the vehicle for ejecting said gas at said given point to provide a boundary layer whose characteristics varies with the flight characteristic involved, said responsive means is a Mach number measuring means; means for comparing the Mach number measured by said Mach number measuring means with a desired Mach number; and means for feeding said gas to the nose portion of said airborne vehicle in an amount depending upon the difference between the measured and desired Mach numbers.

6. The airborne vehicle of claim 5 wherein said last-mentioned means includes means for measuring the air speed of the vehicle, means responsive to said air speed measuring means for decreasing the temperature of said gas with the increase in the airspeed and increasing the temperature of the gas with the decrease in the airspeed, the temperature of the gas for any given airspeed being such that, when the gas is ejected from the vehicle, a boundary layer will be formed which simulates a speed at a Mach number which is at or near a given predetermined Mach number.

7. In an airborne vehicle which flies at optimum efficiency at a given Mach number, the vehicle having a nose portion which cuts through the surrounding air, a system for maintaining the apparent Mach number of the vehicle at a given desired value comprising: means for providing a source of a first gas which, when ejected from the nose portion of said vehicle provides a boundary layer in which sound has a velocity which is substantially greater than that of a boundary layer formed by said surrounding air; means providing a source of a second gas which, when ejected from the nose portion of said vehicle provides a boundary layer in which sound has a velocity which is substantially less than that of a boundary layer formed by said surrounding air; Mach number measuring means for providing a measure of the Mach number of the vehicle; means responsive to said given Mach number and said measuring means for feeding said first gas from said nose portion of the vehicle where the measured Mach number is lower than the said given desired Mach number and for feeding said second gas from said nose portion of the vehicle when the Mach number is greater than said given desired Mach number, the amount of said gases fed from the vehicle being in proportion to the difference between the measured and desired Mach number.

8. The system of claim 7 wherein said means for providing sources of said first and second gases including means for withdrawing air from said surrounding air and for heating the same to different respective temperatures.

9. The airborne vehicle of claim 7 which includes a fuselage and said means for ejecting gas is located at the nose of said fuselage.

10. The airborne vehicle of claim 7 wherein said responsive means includes a bridge circuit having four bridge arms, one arm of said bridge circuit having an impedance means which varies with the Mach number measured by said Mach number measuring means, another arm of said bridge circuit having impedance means which has a value determined by said desired Mach number, and comparison control means including bridge output sensing means which has a first output when the Mach number measured by said Mach number measuring means is above said desired Mach number and an opposite output when the Mach number measured by said Mach number measuring means is below said desired Mach number, and means responsive to said outputs of said bridge circuit for feeding the one of said first and second gases from the nose portion of said vehicle which decreases the difference between the measured and desired Mach number.